US012754321B2

(12) United States Patent
Volfson

(10) Patent No.: US 12,754,321 B2
(45) Date of Patent: Oct. 6, 2026

(54) LASER RANGEFINDER WITH INTEGRATED IMAGING SYSTEM

(71) Applicant: Torrey Pines Logic, Inc., San Diego, CA (US)

(72) Inventor: Leo Volfson, San Diego, CA (US)

(73) Assignee: Torrey Pines Logic, Inc., San Diego, CA (US)

(*) Notice: Subject to any disclaimer, the term of this patent is extended or adjusted under 35 U.S.C. 154(b) by 930 days.

(21) Appl. No.: 18/154,249

(22) Filed: Jan. 13, 2023

(65) Prior Publication Data

US 2023/0228882 A1 Jul. 20, 2023

Related U.S. Application Data

(60) Provisional application No. 63/300,485, filed on Jan. 18, 2022.

(51) Int. Cl.
*G01S 17/894* (2020.01)
*G01S 7/481* (2006.01)
*G01S 17/10* (2020.01)

(52) U.S. Cl.
CPC ............ *G01S 17/894* (2020.01); *G01S 7/481* (2013.01); *G01S 17/10* (2013.01)

(58) Field of Classification Search
CPC ........ G01S 17/894; G01S 7/481; G01S 17/10; G01S 7/4813; G01S 7/51; G01S 17/08; G01S 17/86
See application file for complete search history.

(56) References Cited

U.S. PATENT DOCUMENTS

| | | | | |
|---|---|---|---|---|
| 7,982,794 | B2 | 7/2011 | Wernersson | |
| 8,400,625 | B1 * | 3/2013 | Young | G01B 11/27 356/152.3 |
| 11,525,677 | B2 | 12/2022 | Vogel et al. | |
| 2009/0079960 | A1 * | 3/2009 | Chung | G01S 17/86 356/28 |
| 2013/0335559 | A1 * | 12/2013 | Van Toorenburg | G01S 17/08 348/135 |
| 2014/0063261 | A1 | 3/2014 | Betensky et al. | |
| 2015/0369565 | A1 * | 12/2015 | Kepler | G02B 27/106 348/143 |

(Continued)

FOREIGN PATENT DOCUMENTS

EP 2948791 8/2019

OTHER PUBLICATIONS

Wikipedia.org [online], "Laser rangefinder," Last updated May 7, 2023, [retrieved on May 22, 2023], retrieved from: URL<https://en.wikipedia.org/wiki/Laser_rangefinder>, 6 pages.

*Primary Examiner* — Md Saiful A Siddiqui
(74) *Attorney, Agent, or Firm* — Fish & Richardson P.C.

(57) ABSTRACT

An apparatus includes a laser rangefinder, an imaging device aligned to an optical path of the laser rangefinder, a control interface to activate the laser rangefinder and to cause the imaging device to capture an image during an operating cycle of the laser rangefinder, and a display to display an image of an object captured by the imaging device and a corresponding distance to the target determined by the laser rangefinder. The imaging device can capture an image of an intended target, allowing the operator to verify that the ranged distance provided by the laser rangefinder corresponds to the intended target.

18 Claims, 6 Drawing Sheets

(56) References Cited

U.S. PATENT DOCUMENTS

| | | | | |
|---|---|---|---|---|
| 2016/0084649 | A1 * | 3/2016 | Yamazaki | G01S 17/08 348/139 |
| 2018/0188360 | A1 * | 7/2018 | Berger | G01S 7/497 |
| 2019/0041516 | A1 * | 2/2019 | Edwards | G01S 17/86 |
| 2020/0174130 | A1 * | 6/2020 | Banerjee | B60R 11/04 |
| 2024/0027589 | A1 * | 1/2024 | Nemoto | G01S 7/51 |

* cited by examiner

LASER RANGEFINDER WITH INTEGRATED IMAGING SYSTEM

CROSS REFERENCE TO RELATED APPLICATION

Pursuant to 35 U.S.C. § 119(e), this disclosure claims the benefit of U.S. Ser. No. 63/300,485, filed on Jan. 18, 2022, titled "LASER RANGEFINDER WITH INTEGRATED IMAGING SYSTEM," the entire contents of which are incorporated by reference herein.

BACKGROUND

A laser rangefinder is a rangefinder that uses a laser beam to determine the distance to an object. The most common form of laser rangefinder operates on the time of flight principle by sending a laser pulse in a narrow beam towards the object and measuring the time taken by the pulse to be reflected off the target and returned to the sender. Due to the high speed of light, this technique is not appropriate for high precision sub-millimeter measurements, where triangulation and other techniques are often used.

SUMMARY

Aspects of the embodiments are directed to an apparatus that includes a laser rangefinder; an imaging device aligned to an optical path of the laser rangefinder; a control interface to activate the laser rangefinder and to cause the imaging device to capture an image during an operating cycle of the laser rangefinder; and a display to display an image of an object captured by the imaging device and a corresponding distance to the target determined by the laser rangefinder.

In some embodiments, the laser rangefinder comprises an illumination source and a housing to house the illumination source.

In some embodiments, the housing houses the imaging device.

In some embodiments, the imaging device comprises an imaging device optical aperture and the laser rangefinder comprises a transmission aperture and a reception aperture.

In some embodiments, the imaging device shares an optical aperture with the illumination source.

Some embodiments include a beam splitter residing in an optical path of the illumination source, the beam splitter to direct light from the scene through an aperture of the laser rangefinder into the imaging device.

In some embodiments, the imaging device is mounted on an external side of the housing and the imaging device is optically aligned to the laser rangefinder.

In some embodiments, the illumination source comprises a laser.

In some embodiments, the imaging device comprises a charge-coupled device.

Aspects of the embodiments are directed to a method that includes activating a laser of a laser rangefinder; causing an image capture device to activate based on activating the laser; capturing an image of an object in a scene with the image capture device; determining a range of the object in the scene; and displaying the image of the object in the scene with the range of the object on a display.

In some embodiments, causing the image capture device to activate comprises causing the image capture device to store image data of the scene during an operating cycle of the laser rangefinder.

Some embodiments include continuously displaying image data from the scene on the display; upon activating the laser of the laser rangefinder, capturing and storing image data for a period of time until the range is determined; and displaying the captured image data with the range.

Aspects of the embodiments include a laser rangefinder that includes an imaging device; a laser; a display; a hardware processor; and a non-transitory computer-readable storage medium storing instructions that when executed cause the hardware processor to perform operations including activating a laser of a laser rangefinder; causing an image capture device to activate based on activating the laser; capturing an image of an object in a scene with the image capture device; determining a range of the object in the scene; and displaying the image of the object in the scene with the range of the object on a display; and a housing to house the laser, the display, the hardware processor, and the non-transitory computer-readable storage medium.

In some embodiments, causing the image capture device to activate comprises causing the image capture device to store image data of the scene during an operating cycle of the laser rangefinder.

In some embodiments, the operations include continuously displaying image data from the scene on the display; and upon activating the laser of the laser rangefinder, capturing and storing image data for a period of time until the range is determined; and displaying the captured image data with the range.

In some embodiments, the housing houses the imaging device.

In some embodiments, the imaging device comprises an imaging device optical aperture and the laser rangefinder comprises a transmission aperture and a reception aperture.

In some embodiments, the imaging device shares an optical aperture with the laser.

Some embodiments include a beam splitter residing in an optical path of the laser, the beam splitter to direct light from the scene through an aperture of the laser into the imaging device.

In some embodiments, the imaging device is mounted on an external side of the housing and the imaging device is optically aligned to the laser.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings

BRIEF DESCRIPTION OF THE DRAWINGS

Drawings are not to scale. Like reference numbers represent like features.

DETAILED DESCRIPTION

Figure 1A:
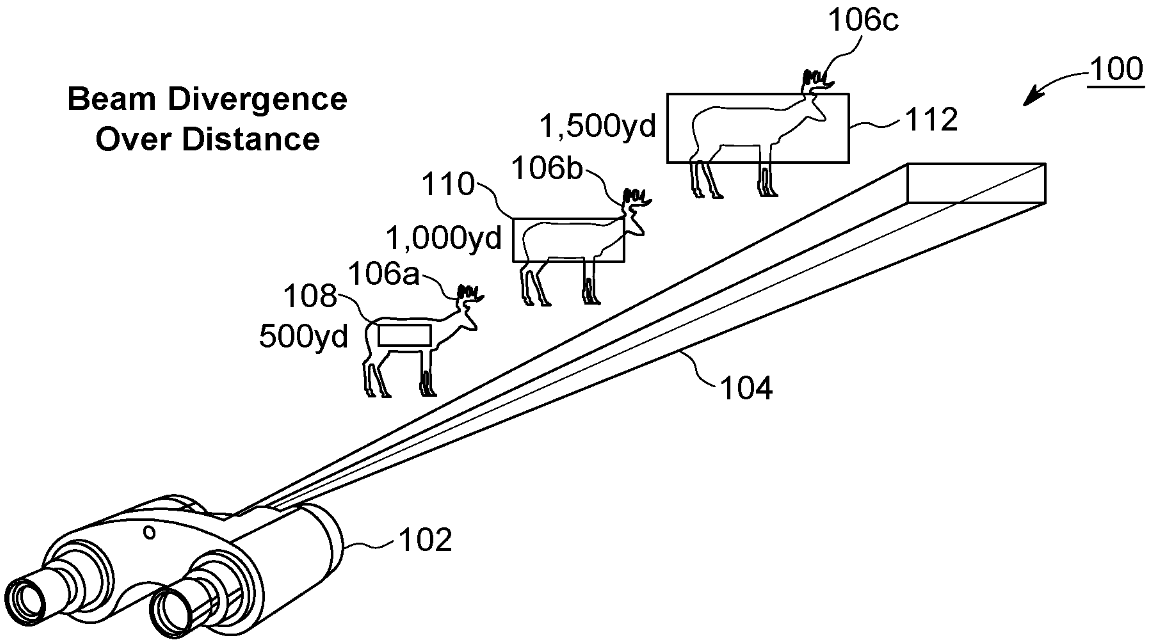
FIGS. 1A-1C are schematic diagrams illustrating beam divergence.
Figure 1B:
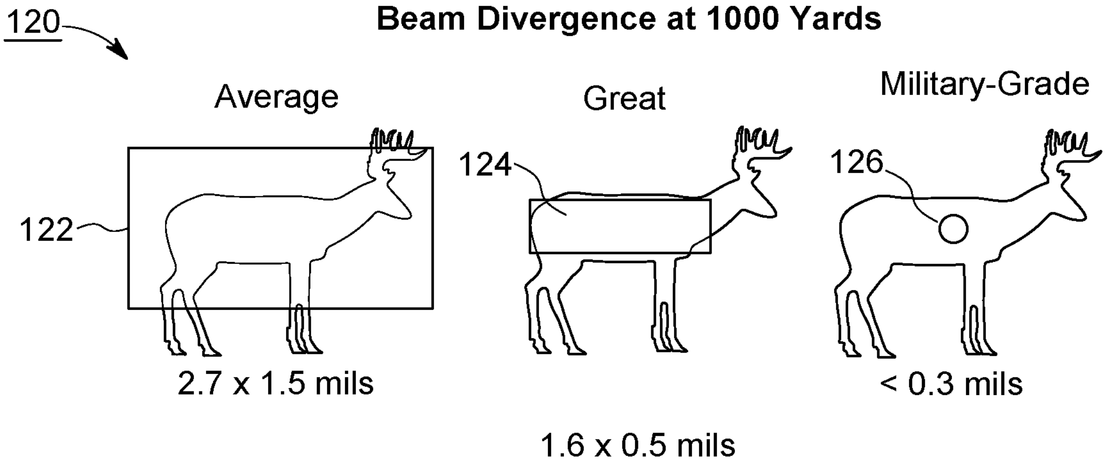
Figure 1C:
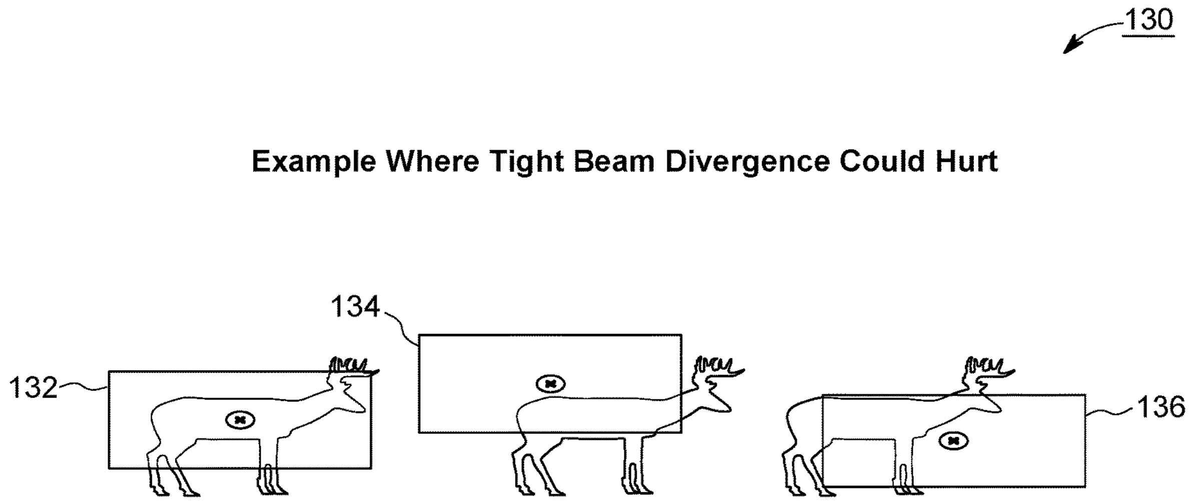

During operation of a laser rangefinder (LRF), beam divergence of the laser beam or other coherent light can occur over distance. FIGS. 1A-1C are schematic diagrams illustrating beam divergence. The beam divergence includes the widening of the light beam over distance. FIG. 1A is a schematic diagram 100 that shows how a laser beam 104 emitted from a laser-emitting rangefinder 102 diverges over distance. FIG. 1A shows a first beam divergence 108 at a 500 yard target 106*a*. At a 1000 yard target 106*b*, a second beam divergence 110 is shown, where the cross-sectional area representing beam divergence is larger than the first beam divergence 108. At a 1500 yard target 106*c*, a third beam divergence 112 is shown, where the cross-sectional area representing beam divergence is larger still than the first beam divergence 108 and the second beam divergence 110. FIG. 1A is meant to be an illustrative representation of beam divergence over distance. FIG. 1B is a schematic diagram 120 showing example beam divergence values for various quality laser rangefinders at 1000 yards. The average beam divergence 122 at 1000 yards is 2.7×1.5 mils. "Great" beam divergence 124 at 1000 yards is 1.6×0.5 mils. Military grade divergence 126 at 1000 yards is less than 0.3 mils. A military grade LRF can cost $24,000 or more. A standard commercial grade LRF has a width of 2 milliradians (mrad). 1 mrad at 1000 yards covers a width of 36 inches. That is, an average, standard LRF illuminates an area of about 6 square feet at 1000 yards. At a longer distance, say 2000 yards, the 1 mrad beam illuminates an area of about 12 feet. The effect of any LRF will actually be averaging the range over the whole painted target area. Thus, for large beam divergence at distances, what object the LFR is measuring a distance to becomes increasingly uncertain, particularly in view of the size of a target. Beam divergence is a function of optical quality, optical length, laser quality, etc. FIG. 1C is a schematic diagram 130 showing how beam divergence can hurt accuracy of range finding. Beam divergence box 132 is shown to overlap the target, indicating that the range to the target is likely accurate. However, beam divergence boxes 134 and 136 can return inaccurate results because much of the beam is off target. In FIG. 1C, each box 132, 134, and 136 represents average beam divergence at 1000 yards. The circle represents beam divergence for a small beam divergence at 1000 yards. In the first instance, the beam divergence 132 allows enough of the beam to impinge on the target even as the beam moves. But even the tight beam divergence moves off the target due to wobble, as shown by boxes 134 and 136. Wobble induced from an unsupported, offhand position could cause more missed readings when using an LRF.

Wobble induced from an unsupported, offhand position could cause more

"missed" readings when using a rangefinder with very tight beam divergence. The box indicates a large beam divergence, and the black circle indicates a tight beam divergence. The dot does not always hit the intended target, but the box includes enough of the target to give the desired distance in all 3 cases.

Figure 2A:
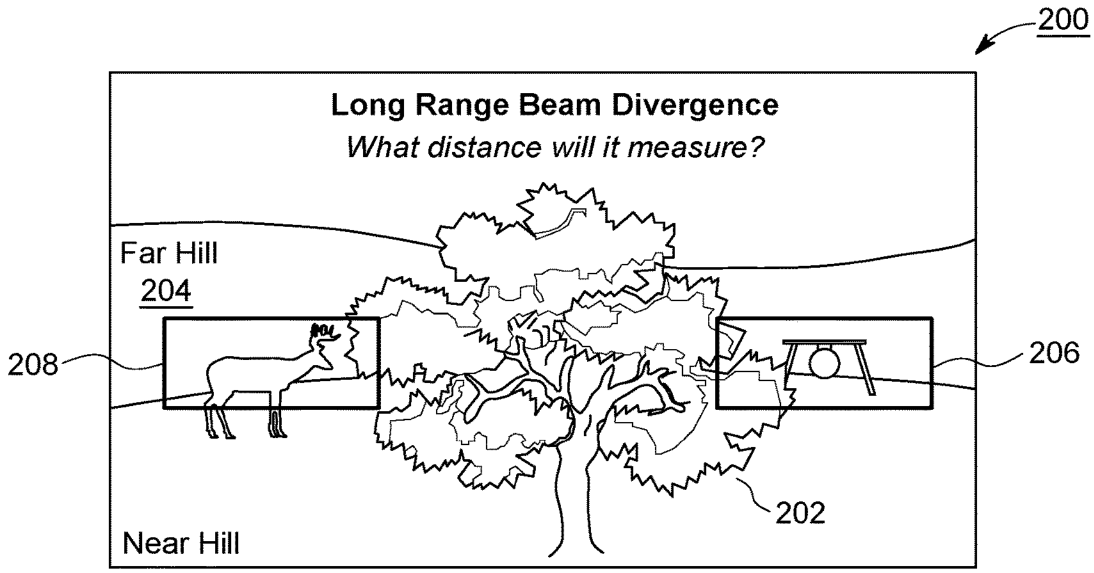
FIGS. 2A-B are schematic diagrams illustrating object recognition problems associated with beam divergence of laser rangefinders.
Figure 2B:
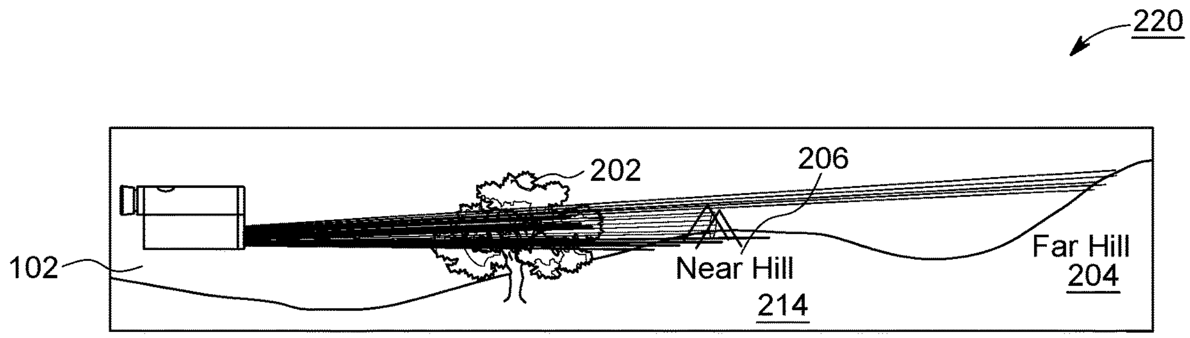

FIGS. 2A-B are schematic diagrams illustrating object recognition problems associated with beam divergence of laser rangefinders. FIG. 2A is a schematic diagram 200 showing how beam divergence can cause the beam to impinge on different targets at different distances laterally downrange. For example, beam divergence can cause a tree 202 to be impinged, but also lateral targets further way from the tree 202, such as target 206 and animal 208. FIG. 2B is a schematic diagram 220 showing how beam divergence can range objects at different distances vertically. For example, target 206 on near hill 214 can be illuminated, but objects on far hill 204 can also be illuminated. In addition, an operator might not be able to confirm target acquisition or target identification at large distances. Thus, at large distances, errant target acquisition can result in erroneous distance measurements.

This disclosure describes an LRF system that works together with a camera pointed in the same direction as the LRF. The camera can be built into the LRF or attached to the LRF housing. The camera can activate when the laser is activated, such that images can be displayed that correspond to distance measurements displayed. This way, the operator can, in real time, verify that the distance displayed is for the target object, as opposed to something else. The camera field of view can be smaller than the beam divergence at a certain distance, ensuring that the camera will only image a scene that the operator is looking at. If the operator moves off the target, then the imager will show that the target has been lost, and the corresponding distance measurement might be inaccurate. While the camera images the intended target, the operator can verify that the LRF is displaying an accurate distance measurement.

In addition, a shooter generally relies on the fact that the LRF iss perfectly aligned to a scope. Because the shooter is using eyes, he is ranging to something that he sees in the scope at crosshairs but the LRF might be aimed at something else. Thus, in this disclosure, the camera that is aligned to the optical path of the outgoing illumination or the incoming illumination in the LRF, so the camera always views and can cause to be displayed the object that the LRF is ranging. As an added benefit, since the LRF can illuminate the object, the camera can use the LRF as a source of illumination for the object. This means that the camera can be configured to detect and cause to be displayed objects that are illuminated by the LRF. In embodiments, the camera can create an image of an object with the highest average illumination, so even if the beam diverges, the camera can be used to verify that the LRF is ranging an intended target.

Figure 3A:
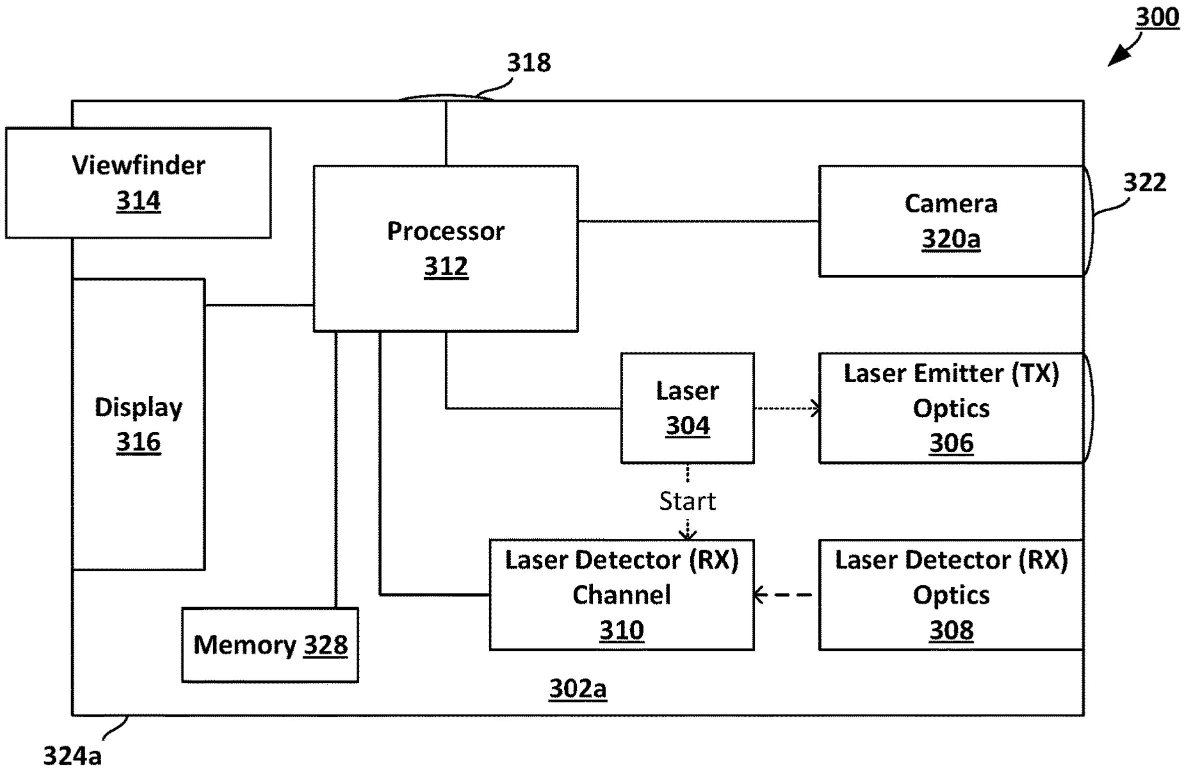
FIGS. 3A-C are schematic diagrams of a laser rangefinder with a camera in accordance with embodiments of the present disclosure.
Figure 3B:
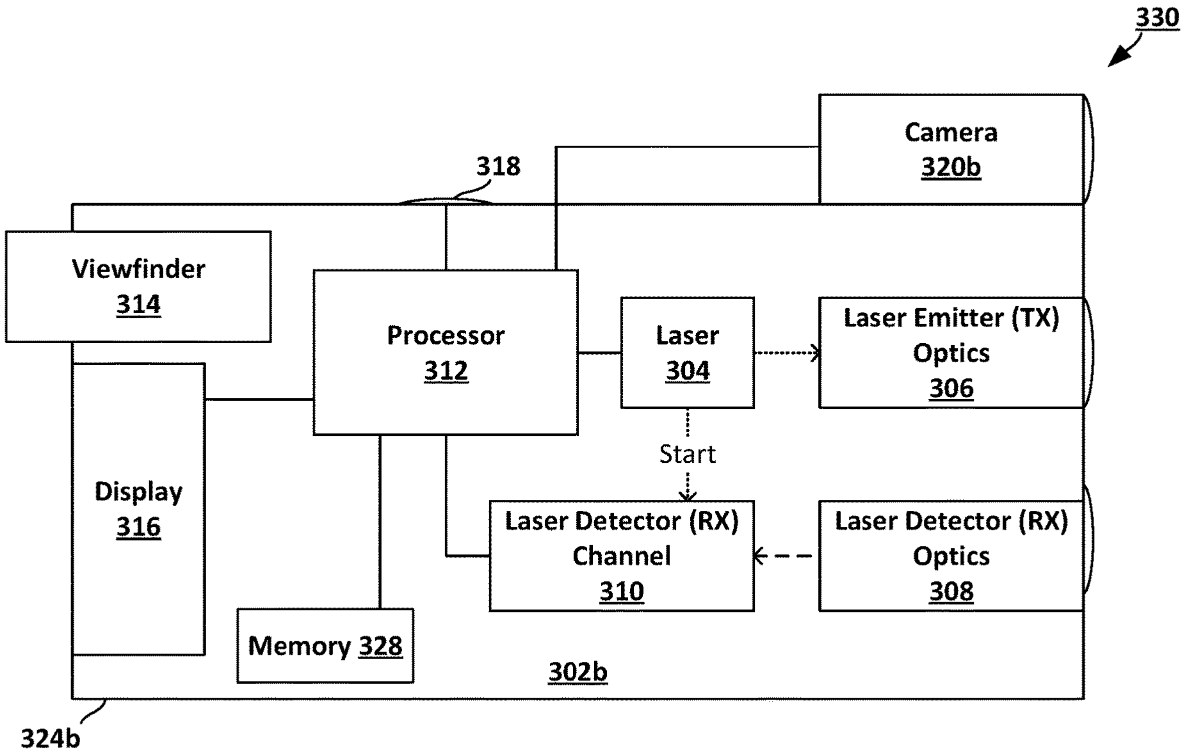
Figure 3C:
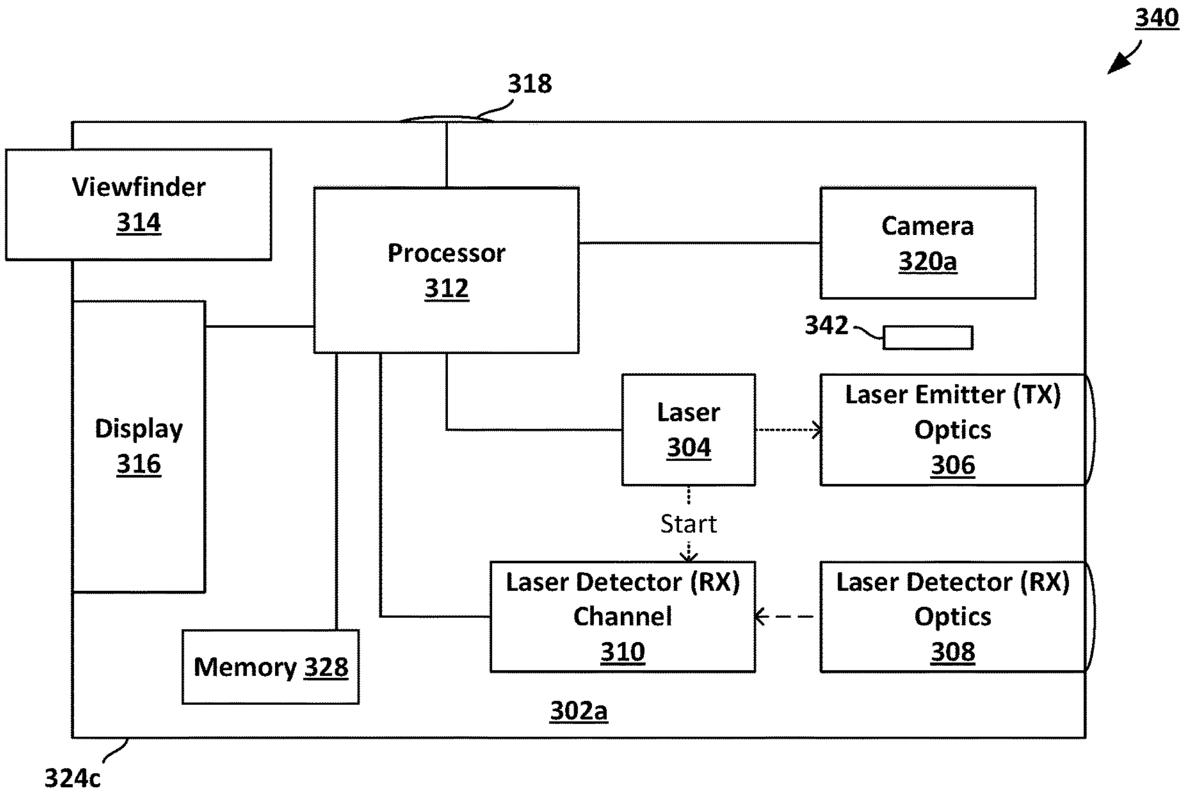

FIGS. 3A-C are schematic diagrams of a laser rangefinder system with a camera in accordance with embodiments of the present disclosure. FIG. 3A is a schematic diagram 300 of an example the laser rangefinder system 300 that includes an integrated imager 320*a* within housing 234 that includes its own aperture 322. FIG. 3B is a schematic diagram 330 of an example the laser rangefinder system 302*b* in which the imager 320*b* is mounted outside of the LRF housing 324*b*. FIG. 3C is a schematic diagram 340 of an example the laser rangefinder system 302*c* in which the imager 320*c* is housed within housing 324*c*, but uses a beam splitter 342 or other optics to share an optical path with the laser, so the imager 320*c* does not use its own aperture.

Generally, the laser rangefinder system 302*a-c* of the present disclosure includes a laser 304 as a source of coherent light or beam. A diode can also be used as the illumination source. The laser rangefinder system 302*a-c* includes a light transmitter that includes a TX aperture and associated optics 306. The laser rangefinder system 302*a-c* can include electronics components to power and drive the laser, which are not shown here for simplicity. Such electronics can include, but are not limited to amplifiers, sample/hold circuitry, timing control, digital logic, etc. The laser rangefinder system 302*a-c* also includes a laser detector RX aperture and associated optics 308. The laser rangefinder system 302*a-c* can also include laser detector channel 310, which can include timing discriminator logic, amplifier circuitry, time-to-digital converter (TDC), laser input from laser 304 for time of flight measurements, etc.

The laser rangefinder system 302*a-c* includes an imager 320*a-c*, respectively (generally, imager 320). The imager can be a still imager to capture still frames or can be an imager that can capture streams of frames, videos, or other types of motion capture. The imager 320 produces a picture or series of pictures taken during the time that LRF measures the target. Imager 320 can include a charge coupled device, light detector, photo diode, or type of imaging device. The imager field of view, magnification, and other optical capabilities are implementation specific. The imager 320, however, is design to view and capture an image of an object in a same optical path as the laser beam. (So, in the box 132 in FIG. 1C, the small circle can represent the center of the imager field of view, and the imager can create images of the center of a target while the laser rangefinder beam overlaps the target; in FIG. 1C, the imager would return an image of something besides the target as the small circle moves off of the target, even if the beam divergence overlaps the target.) The imager 320 would produce an image for displaying on display 316 of whatever the operator has aligned the imager to, which allows the operator to visually verify using the camera image that the range displayed correlates with the intended target. The field of view of the imager 320 would not change over distance, even if the beam diverges. So, the camera can image target objects and can do so while aligned to the laser optics. Thus, the imager 320 views, images, and causes to be displayed, whatever object the LRF is pointed at.

In addition, the imager 320 is activated when the laser 304 is activated (e.g., by control button 318 or other control interface). The synchronization of the imager with the laser means that the imager can quickly capture an image of whatever the operator is pointing the laser at. In that sense, the control button 318 acts as both a laser activation button and a camera activation button. The exposure time of the imager 320 is implementation specific, but as mentioned before, the imager should operate within a small window of time that it takes for the laser beam to reach the object and return.

The imager 320 can have its own aperture (e.g., imager 320*a*) or work through beam splitters 342 (e.g., imager 320*c*). The camera can be hidden inside Tx or Rx apertures, such as in the laser emitter optics 306 or the laser detector optics 308. The imager 320 can be mounted outside of the LRF housing (e.g., imager 320*b*) and generally pointing in the direction of the LRF. The imager controls can by synchronized with the operation of the laser 304. A processor 312 can be used to control the operation of the laser rangefinder, the imager, and the display. The processor 312 can be a hardware processor that executes operations stored in non-transitory storage medium, such as memory 328. Memory 328 can include a solid state memory or other type of memory for storing instructions and for temporarily storing image frames for processing and displaying. The operations can include controlling the laser 304 and imager 320 to operate synchronously such that the laser 304 is activated and the imager 320 captures an image during the time of flight of the laser beam. The processor can also process time of flight information to calculate a range to the object. The processor can also perform image processing on captured images. The processor 312 can also cause the image and the range corresponding to the image to be displayed on display 316.

Once the laser shot of the LRF system 302*a-c* is activated, the imager 320 of the LRF system 302*a-c* will take snapshot of the view of the scene during the laser shot. The laser rangefinder can have an operating cycle, which can include the time it takes for the laser pulse (or pulses) to activate, leave the laser rangefinder, and return to the laser rangefinder from the target. During the operating cycle, the imager can capture an image. In embodiments, the imager 320 can run continuously. The imager 320 can also activate with each laser shot, and be synchronized to the shot of the LRF system 302*a-c*. For example, the imager 320 can continuously be capturing frames of the scene once turned on. This way, the imager 320 and display 316 can also be used together as a viewfinder. The imager 320 can store a frame (or group of frames) that correlate in time with the laser shot. The laser activation can cause a still image to be displayed temporarily along with a corresponding range. After a passage of time or upon operator request, the imager 320 can return to providing continuous images for viewfinding until the laser is activated again.

As an added benefit, the laser 304 can illuminate the target for the imager 320. Thus imager 320 would only display the center of this illumination (if the imager itself has a wider field of view); or the optics of the imager 320 might match the narrow field of view that is bore-sighted with the LRF system 302*a-c*. In some embodiments, the reception of the laser light from the object in the scene can cause the imager to capture the imager. For example, whatever light that is received that causes the laser rangefinder to determine the range can also cause the imager to capture and store an image for displaying.

The resulting image is then presented to the user in variety of ways to show what was actually ranged. This makes the LRF system 302*a-c* more useful, especially at long range, because the intended target can be verified and correlated to an accurate range.

Figure 4:
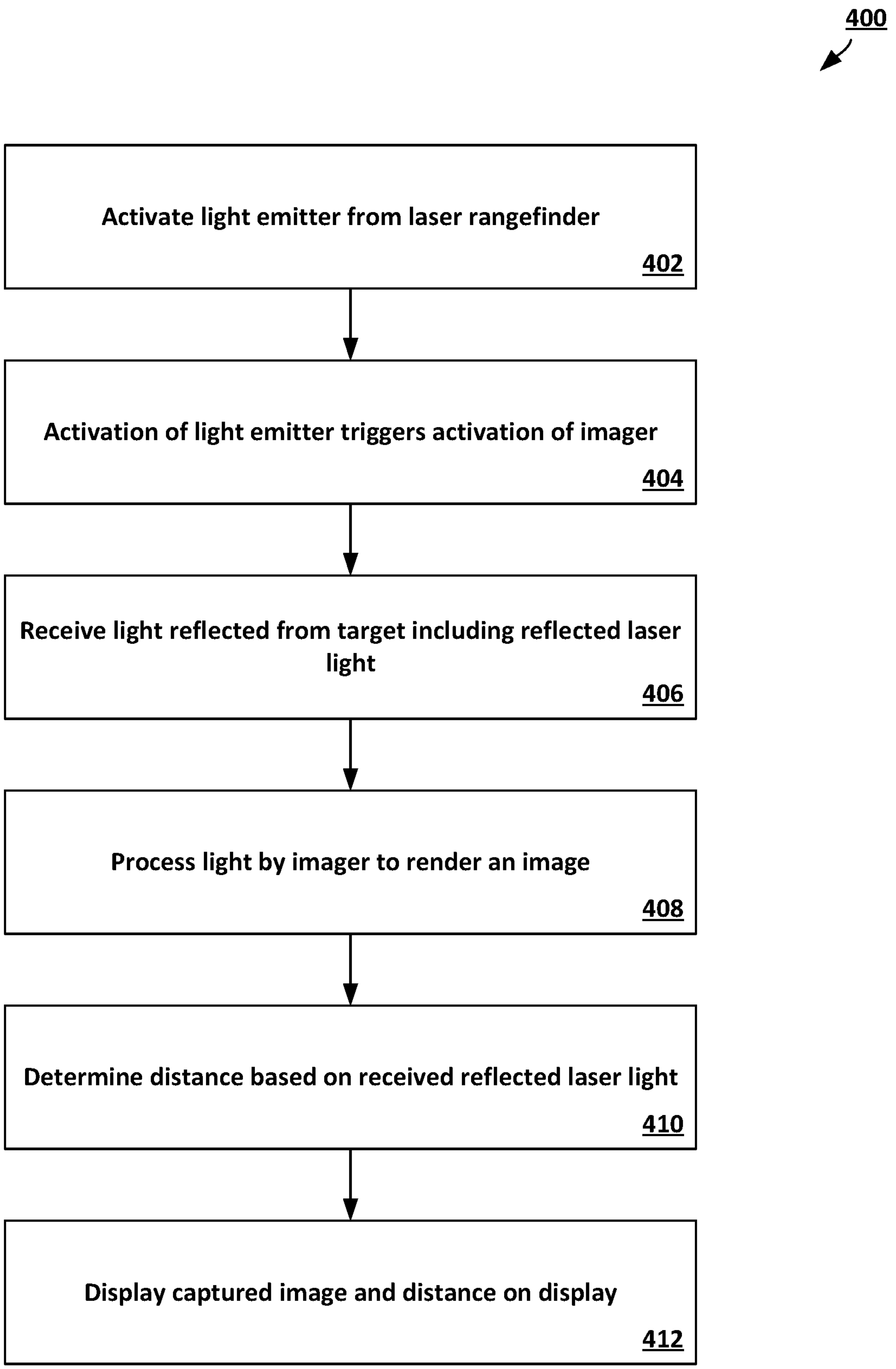
FIG. 4 is a process flow diagram 400 for operating a laser rangefinder system in accordance with embodiments of the present disclosure.

FIG. 4 is a process flow diagram 400 for operating a laser rangefinder system in accordance with embodiments of the present disclosure. A laser rangefinder system can include an imager and a laser rangefinder. The laser rangefinder can be activated based on an instruction received from an operator. (402). The activation of the laser rangefinder can trigger the operation of the imager. (404). Light can be received into an optical aperture of the laser rangefinder, the light including laser light reflected from an object. (406). The light can be processed by the imager or by a processor or both to render an image. (408). The image can be a still image, a series of still images, an image stream, a video, or other type of image. The laser rangefinder can determine the distance based on the received light. (410). The image can be displayed on the display with the ranged distance. (412). The image that is displayed correlates to the target that was ranged.

Embodiments of the present disclosure include a laser rangefinder and a camera. The camera is configured to capture an image when a laser of the laser rangefinder is activated. In embodiments, the laser or light emitted from the laser rangefinder can illuminate a target, the reflected illumination providing light for the camera. The camera can be a still imager or a video camera that can capture still images.

What is claimed is:

1. An apparatus comprising:

a laser rangefinder;

an imaging device aligned to an optical path of the laser rangefinder;

a control interface to activate the laser rangefinder and to cause the imaging device to capture an image during an operating cycle of the laser rangefinder, wherein activating a laser of the laser rangefinder activates the imaging device and causes the imaging device to store image data of a scene with an object during the operating cycle of the laser rangefinder; and a display to display an image of the object captured by the imaging device and a corresponding distance to a target determined by the laser rangefinder.

2. The apparatus of claim 1, wherein the laser rangefinder comprises an illumination source and a housing to house the illumination source.

3. The apparatus of claim 2, wherein the housing houses the imaging device.

4. The apparatus of claim 3, wherein the imaging device comprises an imaging device optical aperture and the laser rangefinder comprises a transmission aperture and a reception aperture.

5. The apparatus of claim 3, wherein the imaging device shares an optical aperture with the illumination source.

6. The apparatus of claim 3, further comprising a beam splitter residing in an optical path of the illumination source, the beam splitter to direct light from the scene through an aperture of the laser rangefinder into the imaging device.

7. The apparatus of claim 2, wherein the imaging device is mounted on an external side of the housing and the imaging device is optically aligned to the laser rangefinder.

8. The apparatus of claim 2, wherein the illumination source comprises a laser.

9. The apparatus of claim 1, wherein the imaging device comprises a charge-coupled device.

10. A method comprising:

activating a laser of a laser rangefinder;

causing an image capture device to activate based on activating the laser;

capturing an image of an object in a scene with the image capture device, wherein causing the image capture device to activate comprises causing the image capture device to store image data of the scene during an operating cycle of the laser rangefinder;

determining a range of the object in the scene; and displaying the image of the object in the scene with the range of the object on a display.

11. The method of claim 10, further comprising:

continuously displaying image data from the scene on the display;

upon activating the laser of the laser rangefinder, capturing and storing image data for a period of time until the range is determined; and displaying captured image data with the range.

12. A laser rangefinder comprising:

an imaging device;

a laser;

a display;

a hardware processor; and a non-transitory computer-readable storage medium storing instructions that when executed cause the hardware processor to perform operations comprising:

activating a laser of a laser rangefinder;

causing an image capture device to activate based on activating the laser;

capturing an image of an object in a scene with the image capture device, wherein causing the image capture device to activate comprises causing the image capture device to store image data of the scene during an operating cycle of the laser rangefinder;

determining a range of the object in the scene; and displaying the image of the object in the scene with the range of the object on a display; and a housing to house the laser, the display, the hardware processor, and the non-transitory computer-readable storage medium.

13. The laser rangefinder of claim 12, the operations comprising:

continuously displaying image data from the scene on the display; and upon activating the laser of the laser rangefinder, capturing and storing image data for a period of time until the range is determined; and displaying captured image data with the range.

14. The laser rangefinder of claim 12, wherein the housing houses the imaging device.

15. The laser rangefinder of claim 14, wherein the imaging device comprises an imaging device optical aperture and the laser rangefinder comprises a transmission aperture and a reception aperture.

16. The laser rangefinder of claim 14, wherein the imaging device shares an optical aperture with the laser.

17. The laser rangefinder of claim 14, further comprising a beam splitter residing in an optical path of the laser, the beam splitter to direct light from the scene through an aperture of the laser into the imaging device.

18. The laser rangefinder of claim 12, wherein the imaging device is mounted on an external side of the housing and the imaging device is optically aligned to the laser.

* * * * *